United States Patent
Meriac et al.

(10) Patent No.: US 10,891,146 B2
(45) Date of Patent: Jan. 12, 2021

(54) ACCESS CONTROL AND CODE SCHEDULING

(71) Applicant: ARM IP LIMITED, Cambridge (GB)

(72) Inventors: Milosch Meriac, Cambridge (GB); Hugo John Martin Vincent, Cambridge (GB); James Crosby, Ely (GB)

(73) Assignee: ARM IP Limited, Cambridge (GB)

( * ) Notice: Subject to any disclaimer, the term of this patent is extended or adjusted under 35 U.S.C. 154(b) by 0 days.

(21) Appl. No.: 15/304,302

(22) PCT Filed: Apr. 20, 2015

(86) PCT No.: PCT/GB2015/051175
§ 371 (c)(1),
(2) Date: Oct. 14, 2016

(87) PCT Pub. No.: WO2015/166211
PCT Pub. Date: Nov. 5, 2015

(65) Prior Publication Data
US 2017/0039085 A1    Feb. 9, 2017

(30) Foreign Application Priority Data
Apr. 28, 2014   (GB) .................................. 1407409.0

(51) Int. Cl.
G06F 9/455  (2018.01)
G06F 21/74  (2013.01)
(Continued)

(52) U.S. Cl.
CPC .......... G06F 9/45558 (2013.01); G06F 9/468 (2013.01); G06F 9/542 (2013.01);
(Continued)

(58) Field of Classification Search
CPC .. G06F 9/45558; G06F 12/1441; G06F 9/468; G06F 9/542; G06F 21/602;
(Continued)

(56) References Cited

U.S. PATENT DOCUMENTS

| | | | | |
|---|---|---|---|---|
| 6,360,244 B1 * | 3/2002 | Bharadhwaj | ........ | G06F 12/1491 711/E12.097 |
| 6,792,392 B1 * | 9/2004 | Knight | ................ | G06F 11/3466 702/182 |

(Continued)

FOREIGN PATENT DOCUMENTS

| | | |
|---|---|---|
| CN | 101114326 A | 1/2008 |
| CN | 102077209 A | 5/2011 |

(Continued)

OTHER PUBLICATIONS

International Search Report for PCT/GB2014/053014, dated Dec. 16, 2014, 2 pages.

(Continued)

*Primary Examiner* — Jung W Kim
*Assistant Examiner* — Bruce S Ashley
(74) *Attorney, Agent, or Firm* — Patterson Thuente Pedersen, P.A.

(57) ABSTRACT

A data processing system operates in a plurality of modes including a first privilege mode and a second privilege mode with the first privilege mode giving rights of access that are not available in the second privilege mode. Application code executes in the second privilege mode and generates function calls to hypervisor code which executes in the first privilege mode. These function calls are to perform a secure function requiring the rights of access which are only available in the first privilege mode. Scheduling code which executes in the second privilege mode controls scheduling of both the application code and the hypervisor code. Memory (Continued)

protection circuitry operating with physical addresses serves to control access permissions required to access different regions within the memory address space using configuration data which is written by the hypervisor code. The hypervisor code temporarily grants access to different regions within the physical memory address space to the system in the second privilege mode as needed to support the execution of code scheduled by the scheduling code.

17 Claims, 4 Drawing Sheets

(51) Int. Cl.
  *G06F 12/14* (2006.01)
  *G06F 9/46* (2006.01)
  *G06F 9/54* (2006.01)
  *G06F 21/60* (2013.01)

(52) U.S. Cl.
  CPC ........ *G06F 12/1441* (2013.01); *G06F 21/602* (2013.01); *G06F 21/74* (2013.01); *G06F 2009/45587* (2013.01)

(58) Field of Classification Search
  CPC ........... G06F 21/74; G06F 2009/45587; G06F 9/455; G06F 21/53
  See application file for complete search history.

(56) References Cited

U.S. PATENT DOCUMENTS

| | | | | |
|---|---|---|---|---|
| 7,543,293 | B2 * | 6/2009 | Willman | G06F 9/468 711/2 |
| 7,865,893 | B1 * | 1/2011 | Omelyanchuk | G06F 11/3644 710/1 |
| 8,209,510 | B1 * | 6/2012 | Thathapudi | G06F 12/145 711/163 |
| 9,152,548 | B2 * | 10/2015 | Tuch | G06F 9/45558 |
| 2002/0073129 | A1 * | 6/2002 | Wang | G06F 9/4881 718/102 |
| 2003/0037237 | A1 * | 2/2003 | Abgrall | G06F 21/53 713/166 |
| 2006/0129710 | A1 | 6/2006 | O'Connor et al. | |
| 2009/0089790 | A1 | 4/2009 | Manczak et al. | |
| 2009/0106754 | A1 | 4/2009 | Liu et al. | |
| 2009/0320048 | A1 | 12/2009 | Watt et al. | |
| 2009/0328058 | A1 * | 12/2009 | Papaefstathiou | G06F 9/485 718/107 |
| 2010/0011344 | A1 * | 1/2010 | Guterman | G06F 21/558 717/124 |
| 2011/0161964 | A1 | 6/2011 | Piazza et al. | |
| 2013/0152209 | A1 | 6/2013 | Baumann et al. | |
| 2013/0227556 | A1 * | 8/2013 | Tsirkin | G06F 21/53 718/1 |
| 2016/0249354 | A1 | 8/2016 | Crosby | |

FOREIGN PATENT DOCUMENTS

| | | | |
|---|---|---|---|
| CN | 102763092 | A | 10/2012 |
| CN | 102902635 | A | 1/2013 |
| WO | WO 2006/115611 | A2 | 11/2006 |
| WO | WO 2014/193443 | A1 | 12/2014 |

OTHER PUBLICATIONS

PCT Written Opinion of the International Searching Authority for PCT/GB2014/053014, dated Dec. 16, 2014, 6 pages.
Application and File history for U.S. Appl. No. 15/027,241, filed Oct. 7, 2014. Inventor: Crosby.
International Search Report for PCT/GB2015/051175, dated Nov. 3, 2015, 6 pages.
Written Opinion for PCT/GB2015/051175, dated Nov. 3, 2015, 10 pages.
GB Search Report for gb1407409.0, dated Nov. 11, 2014, 3 pages.
Garfinkel T: "Terra: a virtual machine-based platform for trusted computing", ACM SOSP. Proceedings of the ACM Symposium on Operating Systemsprinciples; Oct. 19, 2003, Dec. 2003 (Dec. 2003), pp. 193-206, XP002340992.
Gabber et al. "The Pebble Componenet-Based Operating System", Proceedings of the USENIX Technical Conference, 1999. Available from www.usenix.org/events/usenix99/full_papers/gabber/gabber.pdf [Accessed Nov. 6, 2014]. 33 pages.
PCT International Preliminary Report on Patentability for PCT/GB2014/051175, dated Nov. 10, 2016, 12 pages.
Office Action dated Nov. 2, 2018 for Chinese Application No. 201580022893.2, 24 pages.
Office Action dated Apr. 30, 2019 for Chinese Application No. 201580022893.2, 19 pages.
Examination Report dated Nov. 6, 2020 for GB Application No. GB1407409.0, 5 pages.

* cited by examiner

ACCESS CONTROL AND CODE SCHEDULING

RELATED APPLICATIONS

The present application is a National Phase entry of PCT Application No. PCT/GB2015/051175, filed Apr. 20, 2015, which claims priority from GB Patent Application No. 1407409.0, filed Apr. 28, 2014, said applications being hereby incorporated by reference herein in their entirety.

TECHNICAL FIELD

The present technique relates to the field of data processing systems. More particularly, this technique relates to the control of access through the use of different privilege modes together with the control of scheduling of code to be executed.

BACKGROUND ART

It is known to provide data processing systems with different privilege modes. These different privilege modes can give different rights of access. A privilege mode with a higher level of privilege will typically have access to more resources (e.g. able to access more regions of memory, more peripheral devices, more functions etc.) than are available in a lower privilege mode. In some systems hypervisor code may be provided with a highest privilege mode of operation so as to control access to system resources that are provided to other code, such as application code, executing on the system. The security of the hypervisor code is accordingly significant in the security of the system as a whole.

It is also known to provide scheduling code within data processing systems which serves to control the scheduling of different sections of code to be executed.

SUMMARY OF THE INVENTION

Viewed from one aspect the present technique provides a method of processing data using a data processing apparatus having a plurality of privilege modes including a first privilege mode and a second privilege mode, said first privilege mode giving rights of access that are not available in said second privilege mode, said method comprising the steps of:

executing application code in said second privilege mode to generate a function call to hypervisor code to perform a secure function using said rights of access;

upon generation of said function call, executing hypervisor code in said first privilege mode to at least control execution of said secure function; and executing scheduling code in said second privilege mode to control scheduling of execution of said application code and said hypervisor code by said data processing apparatus.

The present technique recognizes that by providing the scheduling code such that it executes in the second privilege mode and controls the scheduling of execution of the application code and the hypervisor code, the hypervisor code can be reduced in complexity in a manner which facilitates its secure operation. Generally speaking, the more complex a piece of code, the higher the likelihood that it will have security weaknesses. The normal design prejudice within the field of operating system design would be to provide the scheduling code as part of the hypervisor code such that the hypervisor code operating in the first privilege mode (highest privilege level) has control of which code is scheduled for execution. In practice this increased complexity within the hypervisor code may reduce its security. Providing the hypervisor code remains in control of secure functions which require the rights of access available in the first privilege mode, security can be maintained. The hypervisor code is responsible for servicing function calls seeking to perform secure functions.

It will be appreciated that the hypervisor code may perform the secure function itself. In other embodiments it is also possible that the hypervisor code delegates the performance of the secure function to other code (e.g. delegated code) and temporarily grants that other code access rights necessary to perform the secure function.

A feature of some embodiments is that an interrupt to the hypervisor code interrupts execution of the secure function. Secure functions might normally be expected to be protected from such interrupts, but as the scheduling code executes in the second privilege mode outside of the hypervisor code, such an arrangement would potentially cause difficulties.

The scheduling code may be arranged to select the next code to be executed upon occurrence of a scheduling event. These scheduling events could take a variety of different forms. Examples of possible scheduling events are completion of execution of code scheduled by execution by the scheduling code, a timer interrupt and a wake-up event when the data processing apparatus starts to execute code (e.g. following a sleep event or possibly a reset).

The rights of access which are available in the first privilege mode and which are not available in the second privilege mode can take a variety of different forms. Examples of rights of access are the ability to access data (e.g. write permissions, read permissions, execute permissions etc.) for certain memory addresses or the right to access peripherals (e.g. memory mapped peripherals such as a DMA engine, a UART, etc.).

As previously mentioned, the hypervisor code may call delegated code executing in the second privilege mode as part of servicing the function call instead of servicing the function call entirely itself. With such an arrangement in some embodiments the delegated code may perform processing operations dependent upon configuration parameters of the data processing apparatus and the hypervisor code may perform processing operations which are independent of these configuration parameters. This facilitates the reuse of the hypervisor code in different data processing apparatus environments and accordingly reduces the testing and verification overhead associated with the hypervisor code which is required to meet high security standards due to its role in preserving the security of the system.

The delegated code may perform a variety of different operations. Examples of such operations are error recovery operations for recovering from error conditions arising during operation of the data processing apparatus and program update of program code stored within the flash memory of such a data processing apparatus. In some embodiments, the delegated code may be responsible for all or part of these operations.

At least some embodiments of the present techniques are useful for maintaining security within low cost low power data processing systems which utilize physical addresses throughout rather than supporting virtual addressing (e.g. virtual addressing used by application code). The use of physical addressing avoids the need to provide and support a memory management unit for translating between virtual and physical addresses. Such memory management units typically represent a significant circuit area, power and code complexity overhead.

Instead of a memory management unit, some embodiments of the present techniques may provide memory protection circuitry that is configured to receive memory access requests specifying a physical address within a memory address space and to separately control access to a plurality of different regions within the memory address space in dependence upon programmable memory protection configuration data and whether or not the data processing apparatus is currently in the first privilege mode or the second privilege mode. Thus, the memory protection unit is able to divide the memory address space at the granularity of regions, (which may have differing sizes and/or variable sizes) and control access to those regions in dependence upon the current privilege mode.

In the context of systems including such memory protection circuitry, application code may serve to generate a request to the hypervisor code to access a given region of memory address space that is not accessible in the second privilege mode in which that application code executes. The hypervisor code may temporarily change the programmable memory protection configuration to permit the application code executing in the second privilege mode to access the given region. Thus, the hypervisor code may temporarily alter the privilege requirements to access a given region upon receipt of an appropriate request from application code, and then revert the protection back following that permitted access such that other application code will not be able to access the given region inappropriately.

The hypervisor code may serve to check whether or not the application code is permitted to access the given region before temporarily changing the programmable memory protection configuration to permit such access. As an example, the hypervisor code may contain a list of which instances/blocks of application code is permitted to access which regions within the memory address space on a temporary basis. If a request is received from application code to access a memory region which is not included within the list of memory regions permitted to access that given region, then the access permission will not be provided.

In some embodiments the hypervisor code may generate a stack memory within the memory address space. The memory protection circuitry may be arranged to prevent access by the hypervisor code itself executing in the first privilege mode to one or more of the plurality of regions such that should a stack memory over-run or under-run result in an attempt to access a region of memory that is not accessible to the hypervisor code, then a memory permission exception will be generated. This feature assists in preventing a malfunction of the hypervisor code from compromising the security of the system.

It will be appreciated that the number of privilege modes provided could vary. In some simple embodiments there may only be provided the first privilege mode and the second privilege mode, but it will be appreciated that in other embodiments, more than two privilege modes may be provided.

In some embodiments, interrupts and exceptions serve to trigger execution of the hypervisor code. The hypervisor code may then delegate the handling of at least some of these interrupts and exceptions to code outside of the hypervisor code itself.

Viewed from another aspect the present technique provides a data processing apparatus having a plurality of privilege modes including a first privilege mode and a second privilege mode, said first privilege mode giving rights of access that are not available in said second privilege mode, said apparatus comprising:

execution circuitry configured:
  to execute application code in said second privilege mode to generates a function call to hypervisor code to perform a secure function using said rights of access;
  upon generation of said function call, to execute hypervisor code in said first privilege mode to at least control execution of said secure function; and
  to execute scheduling code in said second privilege mode to control scheduling of execution of said application code and said hypervisor code by said data processing apparatus.

Viewed from a further aspect the present technique provides a data processing apparatus having a plurality of privilege modes including a first privilege mode and a second privilege mode, said first privilege mode giving rights of access that are not available in said second privilege mode, said apparatus comprising:

execution means for execution code, said execution means configured:
  to execute application code in said second privilege mode to generates a function call to hypervisor code to perform a secure function using said rights of access;
  upon generation of said function call, to execute hypervisor code in said first privilege mode to at least control execution of said secure function; and
  to execute scheduling code in said second privilege mode to control scheduling of execution of said application code and said hypervisor code by said data processing apparatus.

BRIEF DESCRIPTION OF THE DRAWINGS

Embodiments will now be described, by way of example only, with reference to the accompanying drawings in which.

DETAILED DESCRIPTION

Figure 1:
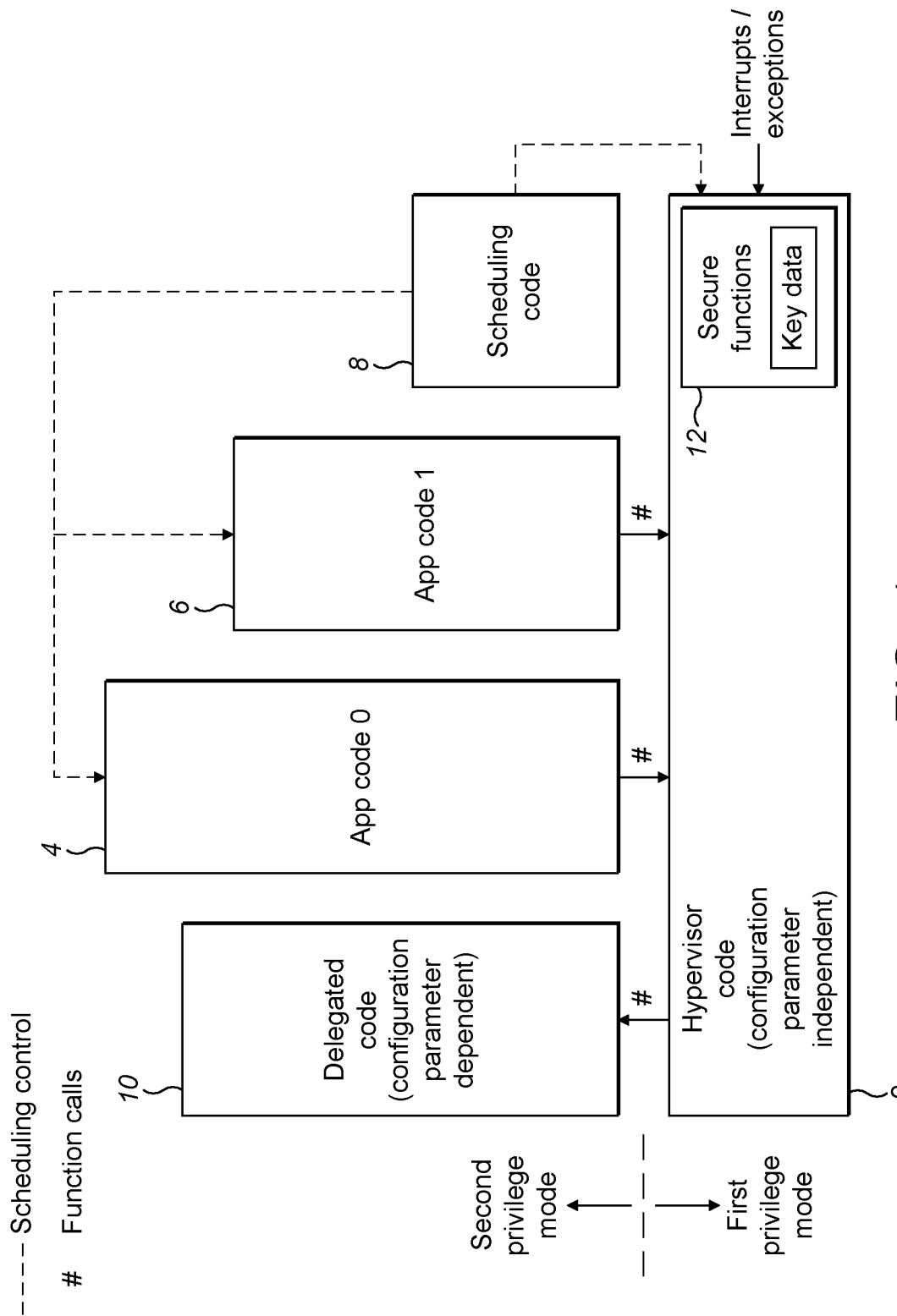
FIG. 1 schematically illustrates different blocks of code executing within different privilege modes.

FIG. 1 schematically illustrates different blocks of code executing within a data processing apparatus. In particular, the blocks of code include hypervisor code 2, multiple instances of application code 4, 6, scheduling code 8 and delegated code 10. The hypervisor code 2 executes in a first privileged mode. The application code 4, 6, the scheduling code 8 and the delegated code 10 all execute in a second privilege mode.

The scheduling code 8 is responsible for scheduling execution of the application code 4, 6 and the hypervisor code 2. The scheduling code 8 performs such scheduling operations upon occurrence of a scheduling event. A scheduling event may include completion of execution of code that has been scheduled for execution by the scheduling code 8, the occurrence of a timer interrupt and/or a wake-up event when the data processing apparatus starts to execute code.

The data processing apparatus may be placed into a sleep mode and a wake-up event may occur triggered by, for example, a timer, a button press by a user, a network packet received from elsewhere, etc.

The hypervisor code 2 is configuration parameter independent relative to the data processing apparatus upon which it is executing. The delegated code 10 is dependent upon the configuration parameters of the apparatus upon which the delegated code 10 executes. In this way, the same hypervisor code 2 may be run on multiple hardware platforms and the hardware platform specific functionality isolated within the delegated code 10.

The hypervisor code 2 includes secure function code 12 which operates in the first privilege mode and performs secure functions, such as cryptographic functions using cryptographic data (e.g. cryptographic keys). The application code 4, 6 makes a function call to the hypervisor code 2 for the hypervisor code to perform a secure function on behalf of the application code 4, 6. The hypervisor code may delegate some or all of this secure function to the delegated code 10 as appropriate. The result of the secure function is returned to the calling application code 4, 6, when the secure function has been completed. In this way, the hypervisor code 2 can protect secure data, such as cryptographic data, and only return results such as pass/fail to the application code 4, 6.

The secure function performed by the hypervisor code 2 may include the function of granting access to a given region of the memory address space of the system to a calling block of application code 4, 6. The hypervisor code 2 may first confirm the validity of the request received and then either grant or not grant access to the region of memory on a temporary basis. Access may be granted by the hypervisor code 2 serving to temporarily modify the privilege level associated with the region of memory concerned, such that code executing in the second privilege mode may temporarily access that region whereas the normal configuration is that only code executing in the first privilege mode would be able to access that region. The hypervisor code 2 accordingly makes temporary "holes" in the security to permit a given block of application code 4, 6 to access that memory region and when execution of that application code has finished, as notified by the scheduling code 8 or the application/delegated code 4, 6, 10, the hypervisor code 2 may block that "hole" and return the privilege protection configuration to its original form.

As previously mentioned, the delegated code may be delegated to perform functions which are dependent upon the configuration parameters of the hardware platform concerned. Examples of functions which may be performed by the delegated code include error recovery operations for recovering from conditions arising in operation of the data processing apparatus. Another example is program update of program code stored within a flash memory of the data processing apparatus.

The hypervisor code 2 may contain a list of which blocks of application code 4, 6 are permitted to access which regions of the memory address space when a request is received from such application code 4, 6. If a request is received to access a given memory region from a block of application code which is indicated as having such permission, then the hypervisor code 2 will temporarily permit access to the calling application code 4, 6 by altering the memory permission configuration such that code executing at the second privilege mode is temporarily given access rights to that given region of the memory address space.

The hypervisor code 2 may itself generate a stack memory within the memory address space. Malfunctioning of, or an attack upon, the hypervisor code 2 may be associated with an over-run or an under-run of such stack memory. The memory permissions may be arranged such that an over-run or an under-run of this type will trigger a memory permission exception and accordingly the hypervisor code 2 may be given some protection against its own malfunction.

In the example illustrated in FIG. 1, the system is provided with only two privilege modes, namely the first privilege mode and the second privilege mode (when executing in the first privilege mode more access rights are available than when executing in the second privilege mode). Such a simple arrangement facilitates a tight control on security. However, in other embodiments it is possible that more than two privilege modes may be provided but that these will include both a first privilege mode and a second privilege mode.

In the example embodiment illustrated in FIG. 1 it will be seen that interrupts and exceptions are first routed to the hypervisor code 2 operating in the first privilege mode. Such interrupts and exceptions may then be delegated (forwarded) to the application code 4, 6 or the delegated code 10 (handler code) operating in the second privilege mode as appropriate. In practice only a relatively small subset of interrupts/exceptions will be security critical and remain under control of the hypervisor code 2 (e.g. system reset) with the other interrupts and exceptions being handled outside of the hypervisor code 2 in a manner which permits the hypervisor code 2 to be simpler, and accordingly more secure.

Figure 2:
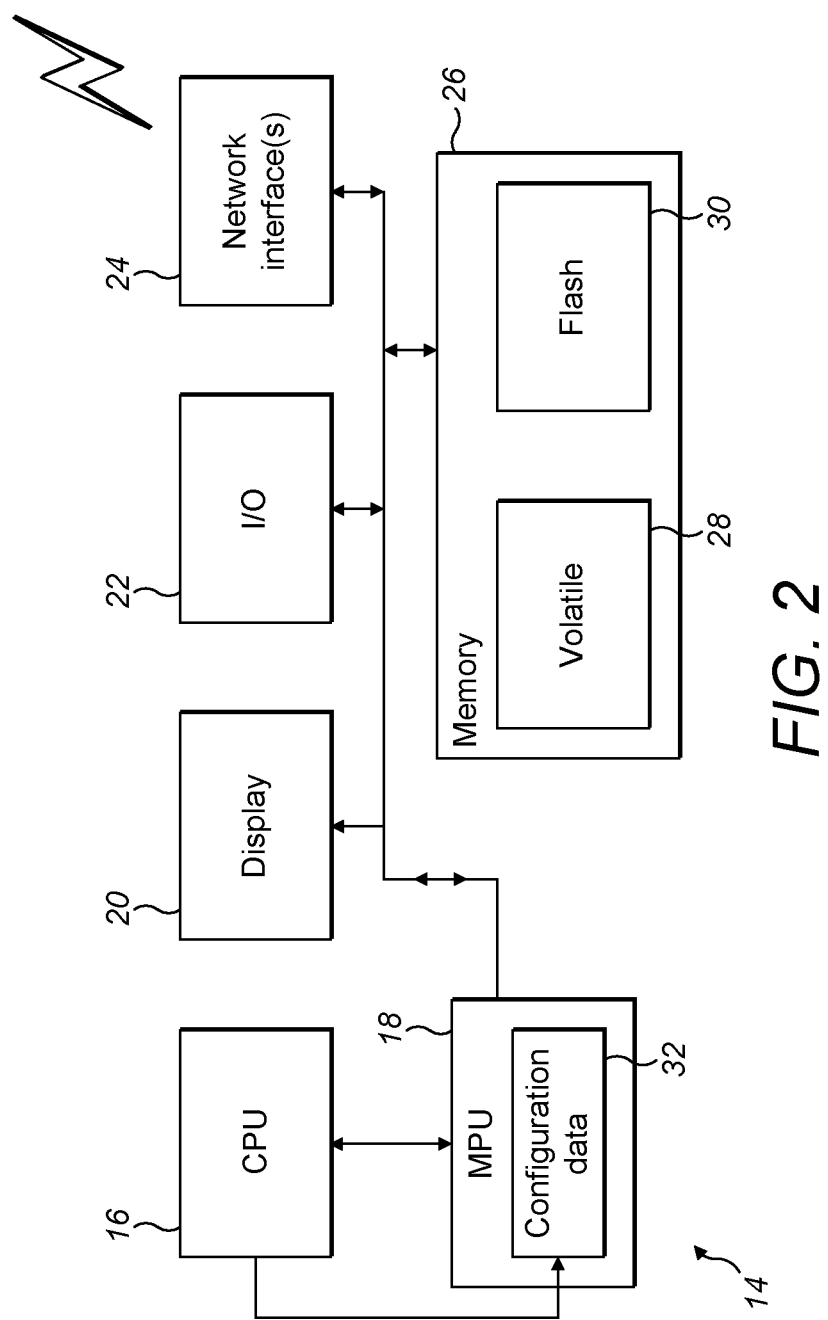
FIG. 2 schematically illustrates data processing apparatus hardware including memory protection circuitry for handling memory permissions within a purely physically addressed system.

FIG. 2 is a diagram schematically illustrating a hardware embodiment of a data processing apparatus 14 for operating in accordance with at least some examples of the present techniques. This data processing apparatus 14 includes a processor core 16 (which may include general purpose registers for holding operand values during processing operations) for executing program instructions (including the application code 4, 6, the scheduling code 8, the hypervisor code 2 and the delegated code 10), memory protection circuitry 18 (e.g. a memory protection unit (MPU) of the type designed by ARM Limited of Cambridge, England), a display unit 20, input/output circuitry 22, network interface circuitry 24 and memory circuitry 26 (including both volatile memory 28 and non-volatile memory 30, such as flash memory). The data processing apparatus 14 illustrated in FIG. 2 uses physical addresses throughout to specify memory storage locations within the memory address space of the memory 26. Accordingly, the processor core 16 generates physical addresses and the program code 2, 4, 6, 8, 10 executing on the processor core 16 is arranged to generate physical addresses. The memory access requests generated by the processor core 16 are passed to memory protection circuitry 18 where memory protection is enforced. The memory protection unit 18 is responsive to programmable (by the processor core 16) memory protection configuration data 32. This configuration data 32 can specify different regions of the overall memory address space and associate different access permissions to be provided for different privilege modes in respect of these different regions. The regions themselves can vary in size and disposition, e.g. they may be overlapping.

The memory protection circuitry 18 may be arranged to provide access control such that the different regions of the memory address space are either accessible only when operating in the first privilege mode or when operating in either the first privilege mode or the second privilege mode. The particular more detailed access permissions which may be supported in some embodiments include permissions individually relating to read access, write access, execute access etc. It is also possible that more privilege modes may be provided, such that permission can be managed on the basis of privilege mode in a more differentiated fashion.

The memory protection circuitry 18 receives an access request from the processor core 16. The memory protection circuitry 18 uses the configuration data 32 to identify the access permission requirements associated with the region within the memory address (physical) which is specified by the received access request. The memory protection circuitry 18, then compares these access permission requirements with the current operating status of the data processing apparatus 14 to determine whether or not the access request is to be either granted or refused. If the request is refused, then a memory permission exception is generated and may be serviced by an appropriate exception handler. If the memory permission requirements are met, then the access request is passed on from the memory protection circuitry 18 to the relevant portion of the memory address space, such as a location within the memory 26 or to a memory mapped peripheral device, such as one of the display 20, the input/output circuitry 22 or the network interface 24.

Figure 3:
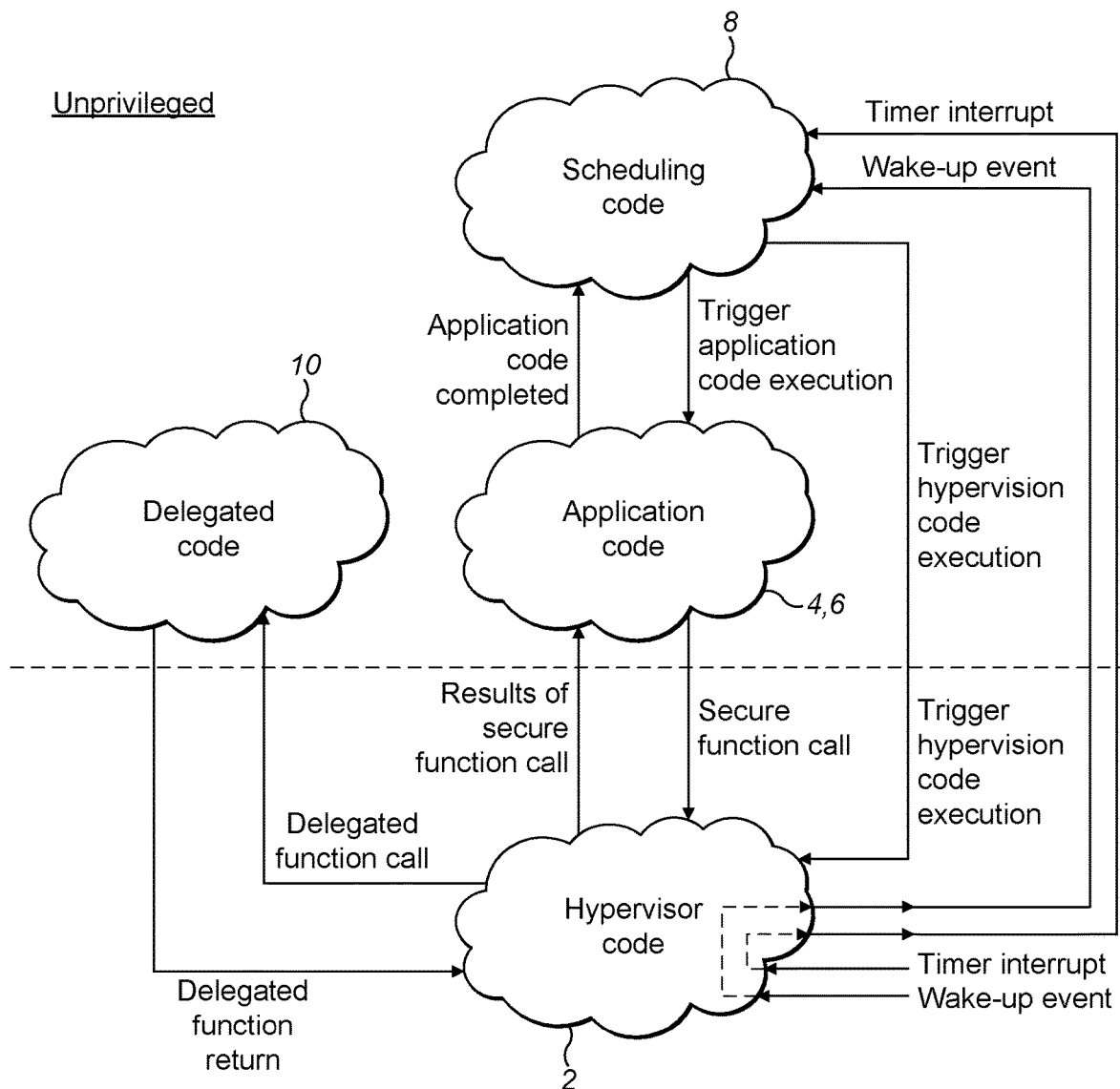
FIG. 3 is a flow diagram schematically illustrating the interaction of hypervisor code, application code, scheduling code and delegated code.

FIG. 3 schematically illustrates the interaction between the hypervisor code 2, the application code 4, 6, the scheduling code 8, and the delegated code 10. The scheduling code 8 is in charge of scheduling which code is to execute next. Upon occurrence of an appropriate scheduling event as previously discussed, the scheduling code 8 will trigger execution of a given block of application code, e.g. one of the blocks of application code 4, 6, illustrated in FIG. 1. When the application code 4, 6 has completed execution, then it sends an application code completed notification (return) back to the scheduling code 8 which will then schedule the next code to be executed. As illustrated in FIG. 3, the horizontal dashed line shows a division between unprivileged (second) mode execution and privilege (first) mode execution. The hypervisor code 2 executes in the privileged mode. The application code 4, 6, the scheduling code 8, and the delegated code 10 all operate in the unprivileged mode. Should the application code 4, 6, require access to a resource (e.g. access to a given region of the memory address space), then it may make a secure function call to the hypervisor code 2 in order to be granted this access. If the hypervisor code 2 determines that the application code 4, 6 is appropriately authorized, and accordingly the request for access is valid, then it may temporarily change the configuration data 32 of the memory protection circuitry 18 to permit access to the given region of memory to be made from the second privilege mode (unprivileged level) by the calling application code 4, 6. In this case, the result of the secure function call made to the hypervisor code 2 would be an indication that the permission had been granted.

Other examples of secure function calls may be requests to verify a data signature, a cryptographic key etc. In this case the hypervisor code 2 may perform the secure function requested and return a result such as pass/fail or a result such as a decrypted block of data when the secure function call had been a request to decrypt such a block of data. The hypervisor code 2 may make a delegated function call to the delegated code 10 to perform part or all of the requested secure function. The delegated code 10 will return the result of the secure function back to the hypervisor code 2, which in turn then passes the results of the secure function call back to the application code 4, 6.

As illustrated in FIG. 3, the scheduling code 8 may also trigger execution of the hypervisor code directly. The scheduling code 8 is thus responsible for scheduling execution of both the application code 4, 6 and the hypervisor code 2. The scheduling code 8 executes in the second privilege mode (unprivileged).

As illustrated, interrupts and exceptions, such as timer interrupts and wake-up events, are routed into the hypervisor code 2. These may be delegated to code outside of the hypervisor code 2 by first redirecting them to the scheduling code 8, which then schedules appropriate application code 4, 6 to execute in response to the timer interrupt or the wake-up event.

The described embodiments operate to forward a privileged exception/interrupt received by the hypervisor 2 to handler code operating in the second privilege mode. This allows the system to support real time responses to exceptions/interrupts, as may be necessary to support a user interface for example, by permitting unprivileged code handling such exception/interrupts to interrupt privileged code that may be running a long term cryptographic operation (e.g. decrypting a stream of data). The hypervisor 2 acts more to protect secrets (e.g. data/keys, time) and less to protect code. In this respect the interruption of the hypervisor 2 does not allow unwanted access to these secrets.

One significant security threat in this situation is that code interrupting privileged operations will get a snapshot of current register contents. Using a timer dense enough when triggering interrupts may make it possible to reconstruct cryptographic secrets from these register samples, and thus to exfiltrate hypervisor (cryptobox) secrets. The register values can be restored upon a return to the hypervisor.

With this problem in mind, it is possible to add exfiltration countermeasures:

when transferring control to second privilege mode code (as the result of an hardware event/exception), flush the general purpose registers of the processor by saving all active registers and clearing or overwriting them with random values before calling unprivileged code.

ensure fixed time bounds for cryptographic operations performed by the hypervisor 2 by recording the time before the cryptographic operation starts and upon finishing the cryptographic operation delaying the return from the function call to the hypervisor invoking the cryptographic operation until one or more of the following:
    a) wait/spin in a loop until a minimum times passes
    b) trigger a CPU sleep until a minimum time passes
    c) wait until a multiple of a coarse time period is reached (for example 100 ms blocks may be ensured—the operation will always take 100 ms, 200 ms or other multiples—which degrades quality of cryptograhic analysis of the time measured for an operation).
    d) wait a random time The countermeasures above help prevent unprivileged code exfiltrating secrets by probing privileged crypto-APIs and measuring execution time.

Other possible countermeasures that may be used separately or in differing combinations include:
  a) Ensure that CPU performance counters are either protected by the MPU, or, if not possible, then adjusted by dummy operations.

Example:
    If unprivileged software can read an instruction counter:
        the countermeasure may be to spin in a loop before returning control to unprivileged code so as to increase the instruction counter to a fixed border (similar to the time approach).
b) Having a dedicated obfuscation mode in the hypervisor, where application code can request timing/power consumption obfuscation from the hypervisor for a chosen interval as a service:
Example:
    where the hypervisor will set a timer to dense randomized intervals where dummy operations are performed—obfuscating the timing and power consumption of unprivileged code to an external attacker
    Access to analog-to-digital converters (ADC) converters (or other input/output devices)
        by unprivileged code could result in a side channel attack to the privileged side resulting in leaked secrets. The hypervisor 2 could perform dummy operations using randomized hardware timers to obfuscate it's operation.

Figure 4:
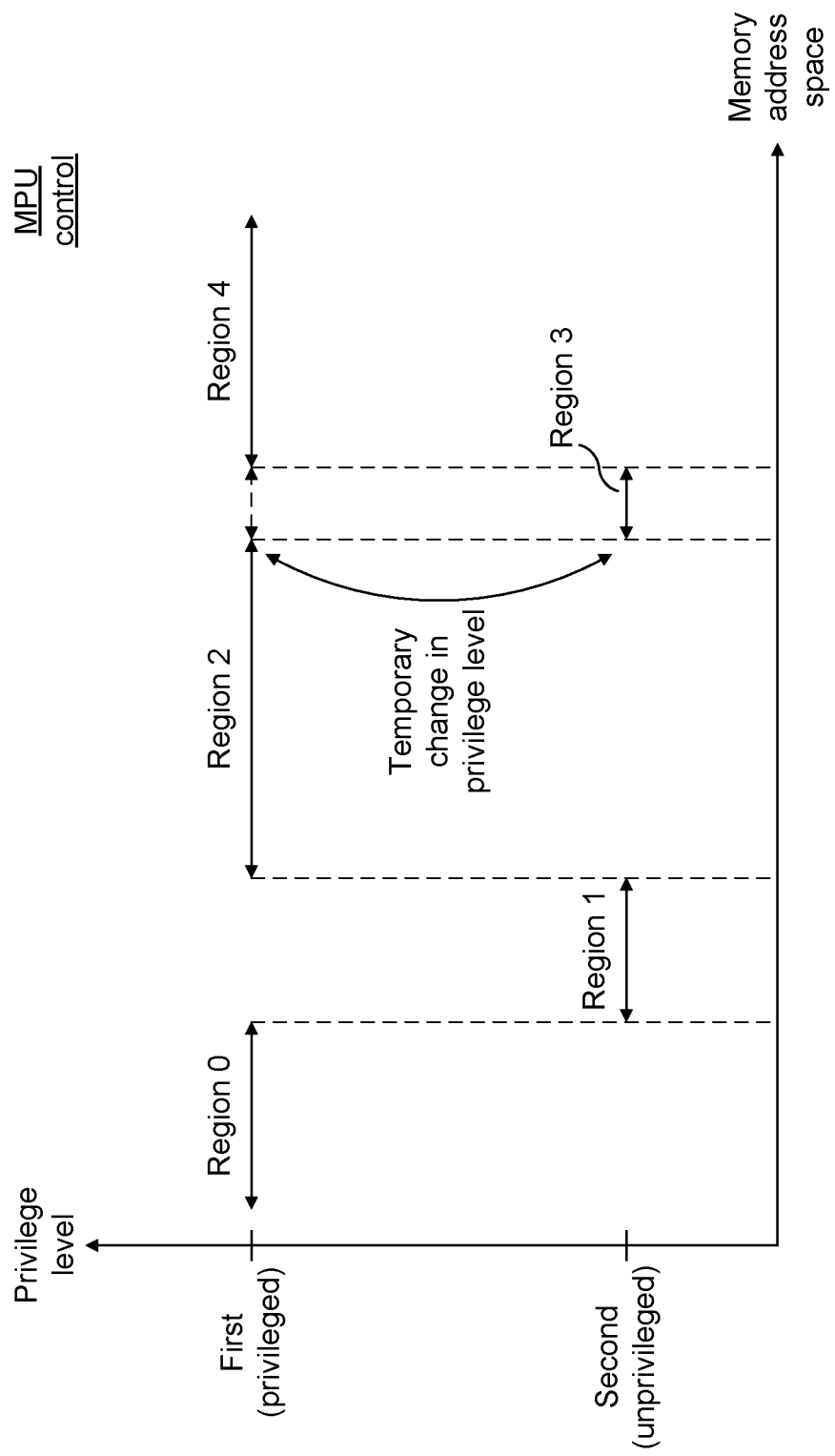
FIG. 4 is a diagram schematically illustrating the action of memory protection circuitry temporarily changing the privilege level required to access a given region of memory within the memory address space.

FIG. 4 schematically illustrates an example of the control of access permissions by the memory protection circuitry 18. In the example illustrated, the memory address space is divided into a plurality of physical memory address space Regions 0, 1, 2, 3, 4. The configuration data 32 held by the memory protection unit 18 (and programmed by the processor core 16) defines in respect of each of these regions whether access is restricted to when the data processing apparatus 14 is in the first privilege mode, or whether access is also permitted when the data processing apparatus 14 is executing in the second privilege mode. In the example illustrated in FIG. 4, Region 1 is permanently accessible in the second privilege mode. Region 0, Region 2 and Region 4 are, at the instant illustrated in FIG. 4, accessible only in the first privilege mode. Region 3 has been temporarily reconfigured to be accessible in the second privilege mode. This permits temporary access to data within that region (range of physical memory addresses) to be made by program instructions executing when the data processing apparatus 14 is in the second privilege mode.

In some embodiments, the different blocks of application code 4, 6 may be stored within different regions of the physical memory address space. The hypervisor code 2 may be arranged to temporarily permit second privilege mode access to those different regions containing the code associated with the different blocks of application code 4, 6. Thus, execution permission (execution requires reading of the relevant program instructions and accordingly memory access) is restricted to a given block of application code 4, 6 at a given instant under control of the hypervisor code 2. Should an attempt be made to inappropriately divert execution to different code not forming part of the block of code for which execution permission has been given by the hypervisor code 2, then such code will not execute as the system will be at the second privilege mode and the region containing the unauthorized code will not be configured as accessible when the system is in the second privilege mode. The hypervisor code 2 accordingly opens regions of the memory address space out of which code may be executed with these regions associated with different blocks of application code 4, 6. The hypervisor code 2 may also temporarily open regions within the physical memory address space containing data which is to be manipulated by the application code 4, 6 which has been permitted to execute.

When the scheduling code notifies the hypervisor code 2 that a given block of application code has completed its execution, the temporary change in the configuration data 32 may be reversed such that execution permission for that block of application code 4, 6 is removed. Another, or the same, block of application code 4, 6, can then be authorized to execute by further change in the configuration data 32 under control of the hypervisor code 2.

The invention claimed is:

1. A method of processing data using a data processing apparatus having a plurality of privilege modes including a first privilege mode and a second privilege mode, said first privilege mode giving rights of access that are not available in said second privilege mode, said method comprising the steps of:
    executing application code in said second privilege mode to generate a function call to hypervisor code to perform a secure function using said rights of access;
    upon generation of said function call, executing hypervisor code in said first privilege mode to at least control execution of said secure function; and
    executing scheduling code in said second privilege mode to control scheduling of execution of said application code in said second privilege mode by said data apparatus and executing scheduling code in said second privilege mode to control scheduling of execution of said hypervisor code in said first privilege mode by said data processing apparatus by determining, in the second privilege mode, which of a plurality of sections of said hypervisor code is to execute in the first privilege mode after a scheduling event,
    wherein said hypervisor code calls delegated code executing in said second privilege mode as part of servicing said function call.

2. A method as claimed in claim 1, wherein said hypervisor code performs said secure function.

3. A method as claimed in claim 1, wherein occurrence of an interrupt to said hypervisor code interrupts said execution of said secure function.

4. A method as claimed in claim 1, wherein said scheduling event is one of:
    completion of execution of code scheduled for execution by said scheduling code;
    a timer interrupt; and
    a wake-up event when said data processing apparatus starts to execute code.

5. A method as claimed in claim 1, wherein said rights of access includes access to cryptographic data and said secure function is a cryptographic function using said cryptographic data.

6. A method as claimed in claim 1, wherein said delegated code performs processing operations dependent upon configuration parameters of said data processing apparatus and said hypervisor code performs processing operations independent of said configuration parameters.

7. A method as claimed in claim 6, wherein delegated code performs one of:
    error recovery operations for recovering from error conditions arising in operation of said data processing apparatus; and
    program update of program code stored within a flash memory of said data processing apparatus.

8. A method as claimed in claim 1, wherein said data processing apparatus includes memory protection circuitry configured to receive a memory access request directly specifying a physical address within a memory address space of said data processing apparatus and to separately to control access to a plurality of different regions within said memory address space in dependence on programmable memory protection configuration data and whether said data processing apparatus is in said first privilege mode or said second privilege mode.

9. A method as claimed in claim 8, wherein said application code generates a request to said hypervisor code to access a given region of said memory address space that is not accessible in said second privilege mode and said hypervisor code temporarily changes said programmable memory protection configuration data to permit said application code executing in said second privilege mode to access said given region.

10. A method as claimed in claim 9, wherein, upon receiving said request, said hypervisor code checks whether or not said application code is permitted to access said given region before temporarily changing said programmable memory protection configuration if said application code is permitted access.

11. A method as claimed in claim 8, wherein said application code includes a plurality of blocks of application code, at least some of said plurality of blocks of application code being associated with different regions within said memory address space and said hypervisor code serving separately to temporarily permit different blocks of application code to access at least one region of memory that is only accessible in said first privilege mode.

12. A method as claimed in claim 8, wherein said hypervisor code generates a stack memory within said memory address space, said memory protection circuitry operates to prevent access by said hypervisor code executing in said first privilege mode to one or more of said plurality regions and said stack memory is located within said memory address space such that at least one of over-run and under-run of said stack memory results in an attempt to access said one or more of said plurality of regions that triggers a memory permission exception.

13. A method as claimed in claim 1, wherein the plurality of privilege modes comprises only said first privilege mode and said second privilege mode.

14. A method as claimed in claim 1, wherein occurrence of one of an interrupt signal or an exception triggers execution of said hypervisor code in said first privileged mode and said hypervisor code forwards processing of said interrupt signal or exception to handler code executing in said second privilege mode.

15. A method as claimed in claim 1, wherein performance counters for monitoring performance parameters of said data processing apparatus are accessible in said first privilege mode and not accessible in said second privilege mode.

16. A method as claimed in claim 1, wherein said data processing apparatus has an obfuscation mode into which said hypervisor code may switch operation of said data processing apparatus including execution of said application code and which serves to obfuscate one or more of: timing of operations, power consumption and access to input/output devices.

17. A data processing apparatus having a plurality of privilege modes including a first privilege mode and a second privilege mode, said first privilege mode giving rights of access that are not available in said second privilege mode, said apparatus comprising:
    a hardware processor to execute code, said hardware processor:
    to execute application code in said second privilege mode to generate a function call to hypervisor code to perform a secure function using said rights of access;
    upon generation of said function call, to execute hypervisor code in said first privilege mode to at least control execution of said secure function; and
    to execute scheduling code in said second privilege mode to control scheduling of execution of said application code in said second privilege mode by said data apparatus and executing scheduling code in said second privilege mode to control scheduling of execution of said hypervisor code in said first privilege mode by said data processing apparatus, by determining, in the second privilege mode, which of a plurality of sections of said hypervisor code is to execute in the first privilege mode after a scheduling event,
    wherein said hypervisor code calls delegated code executing in said second privilege mode as part of servicing said function call.

\* \* \* \* \*